United States Patent [19]

Hoyt et al.

[11] Patent Number: 5,206,652
[45] Date of Patent: Apr. 27, 1993

[54] DOPPLER RADAR/ULTRASONIC HYBRID HEIGHT SENSING SYSTEM

[75] Inventors: Reed W. Hoyt, Framingham; John F. Lanza, Natick, both of Mass.

[73] Assignee: The United States of America as represented by the Secretary of the Army, Washington, D.C.

[21] Appl. No.: 788,951

[22] Filed: Nov. 7, 1991

[51] Int. Cl.⁵ .............................................. G01S 13/86
[52] U.S. Cl. .......................................... 342/52; 367/99
[58] Field of Search ............................................ 342/52

[56] References Cited

U.S. PATENT DOCUMENTS 3,707,717 12/1972 Frielinghaus ........................ 342/52

Primary Examiner—T. H. Tubbesing
Attorney, Agent, or Firm—Werten F. W. Bellamy; John Francis Moran

[57] ABSTRACT

A height measurement system uses an inexpensive ultrasonic height measuring device to provide an apparent height of a descending airborne object. To compensate for movement of the object during the ultrasonic measurement, a Doppler radar velocity measuring device determines the vertical velocity in a short measurement period. The measured vertical velocity is used to determine the vertical distance travelled during the ultrasonic measurement and to compensate therefor by converting the apparent height to a true height of the descending object. Updates of the true height may be obtained by storing the vertical velocity and retrieving the vertical velocity for multiplication by a time value to obtain an updated value of the true height.

10 Claims, 2 Drawing Sheets

DOPPLER RADAR/ULTRASONIC HYBRID HEIGHT SENSING SYSTEM

TECHNICAL FIELD

This invention relates to systems for measurement of true height under dynamic conditions, and more particularly to systems applicable to measurement of height and velocity experienced by an airdropped parachutist or payload, or by a descending aircraft, at short vertical ranges, such as heights of less than approximately 200 feet, for vertical velocities in a range of less than approximately 100 feet per second. Still more specifically, the invention relates to a system for correcting an apparent height measured by an ultrasonic transducer by utilizing a vertical velocity measured by doppler radar t provide substantially real time compensation.

BACKGROUND ART

The prior art has established numerous techniques for distance measurement. For example, U.S. Pat. No. 3,757,285 discloses an acoustic range finder. Compensation is provided for factors affecting speed of travel of an acoustic pulse through a medium, such as temperature, pressure, humidity, etc. of the medium. Compensation is specifically provided by changing the frequency of a reference oscillator used in the system.

Such techniques may be used for height measurement for a descending object, such as a parachutist or a payload, as noted in U.S. Pat. No. 4,618,110. Therein, a distance from the surface measured by ultrasonic devices is compared with predetermined values to provide a quick release lock for automatically releasing the parachute from the load, or person, when the distance is zero.

A system for measurement of both distance and velocity of approaching targets at short distances, usable for approaching aircraft and in an airplane landing service, is disclosed in Marukawa et al., "An Accurate System of FM-CW Radar for Approach Using Phase Detection", *Electronics and Communications in Japan*, Vol. 58-B, No. 2, pp. 65-73, February 1975. Therein, a single Doppler system is used for both distance and velocity measurement, requiring performance of complex calculations in order to provide the results from measurement of the frequency of beat signals and from signal phase changes. The publication appears to be directed at solving a problem of a step error specific to distance measurement using FM radar rather than at correcting the result of the measurement for intrinsic errors due to movement of the object. The system thus relies on radar transducers for measuring short distances above the ground, which are unreliable and are extremely expensive.

Moreover since preferred, less expensive, height measurement systems are acoustic in nature, utilization of the disclosed Marukawa et al. system requires complete replacement of an existing system by a more expensive system rather than improving the accuracy of the existing system by adding a less expensive and more simply implemented modification. Thus, rather than correcting deficiencies in existing sonic systems, the Marukawa et al. disclosure is directed at attaining similar improvement in accuracy by using systems wherein the moving-distance signal is measured to an accuracy approximately equal to a half wavelength at the carrier frequency of the Doppler radar based distance measuring signal.

Japanese publication 2-62991 (A) measures moving distance and speed of an object by providing a doppler radar main body 10 with a high frequency or ultrasonic wave oscillator 11. From the brief English language disclosure therein, the nature of the interaction between a Doppler signal output from an amplifier 15 and the ultrasonic oscillator is not apparent. However, it appears from the disclosure that the Doppler frequency is used to determine the distance by which the object moves, as noted at lines 6-8 of the "Constitution" section thereof. Moreover, from the last two lines of the "Constitution" section it seems that speed is calculated, rather than being detected and used to compensate for errors in the distance computation.

U.S Pat. No. 3,838,421 provides an interaction between radar and sonic devices. However, a radar range pulse is enabled by a sonic pickup pulse from a vibration transducer detecting wheel contact with the airport surface in order to determine a range difference between the actual aircraft landing touchdown and the theoretical touchdown point on the runway.

A speed forecasting circuit is disclosed in Japanese publication 1-182776 (A). Therein, position and speed information of a tracked moving object are stored and converted into coordinates for the object. The system outputs forecast speed information of the moving object as a projection from previous forecast information.

There is accordingly a need in the prior art to provide an improved accuracy dynamic distance short range acoustic measuring system.

Still a more particular need exists in the prior art for correcting errors occurring in a height measurement because of vertical movement during a relatively long period of time used for height measurement by an ultrasonic device.

There is yet a further need in the prior art to be able to correct for such long measurement periods by using short measurement periods available for velocity measurement devices.

There is a more specific need in the prior art to provide a hybrid system which corrects height measurements made by an ultrasonic height measurement system for vertical velocity by using a Doppler radar system operating in shorter measurement periods and relatively unaffected by the distance measurement.

SUMMARY OF INVENTION

It is accordingly an object of the present invention to provide an improved accuracy dynamic distance short range acoustic measuring system.

It is a more particular object of the invention to correct errors occurring in a height measurement device because of vertical movement during the time required for making the height measurement with an ultrasonic device.

It is a further object of the invention to correct for long measurement periods, required by an ultrasonic device to make a height measurement, by compensating the apparent height measured thereby with the aid of velocity measurements made during shorter measurement periods.

It is a more specific object of the invention to provide a hybrid system which corrects height measurements made by an ultrasonic height measurement system by compensating for vertical velocity with the aid of a Doppler radar system operating in shorter measurement periods.

In accordance with these and other objects of the invention, there is provided a hybrid distance measuring apparatus for correcting ultrasonic distance measurements. The ultrasonically measured distance between two objects, which is preferably a height between a descending airborne object and a landing surface therefor, is compensated by determining the relative velocity of the objects, which is preferably a vertical velocity of the airborne object towards the landing surface. Such a hybrid distance measurement apparatus includes ultrasonic rangefinder for measuring a distance between the objects by transmission and reflection of ultrasonic signals. A radar device is used for measuring a relative velocity between the first and second objects by transmission and reflection of radar signals. A distance compensating device compensates for errors in an apparent distance measured by the ultrasonic rangefinder by modifying the apparent distance in accordance with the relative velocity measured by the radar device and producing an indication of true distance between the objects.

In accordance with an aspect of the invention, the ultrasonic rangefinder produces a first signal indicating the apparent distance detected thereby and the radar device produces a second signal indicating a relative velocity measured thereby. The distance compensating device includes a computing device responsive to the second signal for computing a further relative distance travelled by the objects during measurement of the apparent distance by the ultrasonic rangefinder. A conversion device, which may be in the nature of a function programmed into the computing device, converts the apparent distance measured by the ultrasonic rangefinder to the true distance and converts the first signal to a third signal indicating a true distance between the objects.

In accordance with another aspect of the invention, the hybrid distance measuring apparatus further includes a memory for storing the relative velocity measured by the radar device and for storing a true distance. An updating device is provided updating a previously obtained true distance by accessing the true distance in the memory at a predetermined time after the true distance was obtained. The updating device accesses the relative velocity from the memory, obtaining a product of the relative velocity and the predetermined time, and performs a signed addition of the product and the previously obtained true distance, thereby to obtain a sum representing a new value of the true distance between the two objects.

In accordance with yet another feature of the invention, the ultrasonic rangefinder provides a first signal indicating transmission of an ultrasonic pulse thereby and a second signal indicating provision of an echo pulse thereto. The first rangefinder signal is connected to a counter for initiation of a counting process at a predetermined clock frequency corresponding to a time required for the ultrasonic pulse to travel a predetermined distance, such as one foot, through a medium between the two objects. The second rangefinder signal is connected to the counter for terminating the counting process. The counter outputs a count signal upon termination of the counting process, representing the apparent distance between the objects. The radar device outputting a radar signal representing the relative velocity. The computing device receives the count signal and the radar signal and is programmed to compute the apparent distance represented by the count signal, to compute a compensating factor therefor, and to convert the count signal representing the apparent distance to an output signal representing the true distance.

As will be appreciated, the invention thus advantageously utilizes an accurate Doppler radar device to obtain an accurate velocity measurement for a dynamic situation wherein an object, such as a plane, an individual or a payload, is moving at 10 to 200 feet per second relative to the ground while an ultrasonic range finder determines the height thereof. Thus, apparent distance errors encountered because of the processing time for ultrasonic height measurements are corrected in real time by using the Doppler radar velocity measurements.

A specific advantage of the invention is that low cost, off-the-shelf items are utilized to determine the height and velocity of such objects. Particularly, reliable and low cost ultrasonic ranging systems may continue to be used, and do not need to be replaced. Instead, only a low cost Doppler velocity measuring device is required to be used in conjunction therewith.

Use of a low cost, integrated chip microprocessor for processing the Doppler information and for using the same to correct the ultrasonic data further maintains a high level of reliability while requiring minimal expenditure therefor.

The resultant system is thus reliable, compact and lightweight, dissipates only a low level of additional power, and is easily calibrated.

These and other objects, features and advantages of the present invention will become readily apparent to those skilled in the art from the following description and drawing, wherein there is shown and described a preferred embodiment of the invention, simply by way of illustration and not of limitation of one of the best modes (and alternative embodiments) suited to carry out the invention. The invention itself is set forth in the claims appended hereto. As will be realized upon examination of the specification and drawings and from practice of the same, the present invention is capable of still other, different, embodiments and its several details are capable of modifications in various obvious aspects, all without departing from the scope of the invention as recited in the claims. Accordingly, the drawing figures and the descriptions provided herein are to be regarded as illustrative in nature and not as restrictive of the invention.

DESCRIPTION OF THE DRAWING

The accompanying drawing figures, incorporated into and forming a part of the specification, illustrate several aspects of a preferred embodiment of the present invention and, together with the description, serve to explain the principles of the invention. In the drawing.

BEST MODE FOR CARRYING OUT THE INVENTION

Figure 1:
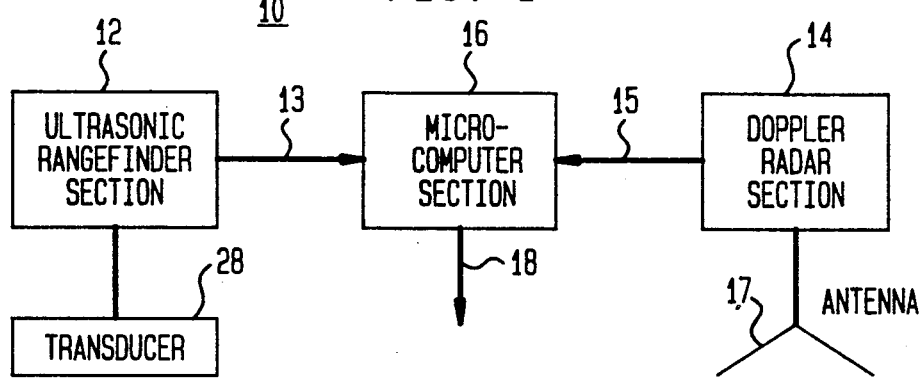
FIG. 1 show is a block diagram of the broad concept of the invention.

Referring now to the drawing, FIG. 1 generally illustrates a system in accordance with the invention. As illustrated in FIG. 1, an improved, hybrid height sensing system 10 in accordance with the invention is generally shown. The system includes three basic components: an ultrasonic rangefinding section 12, functioning in a known manner to provide a first signal 13 indicative of apparent distance between two objects and particularly the apparent height of an airborne object relative to a landing surface therefor, a Doppler radar section 14, similarly functioning in a known manner provides a second signal 15 indicative of the relative velocity between the objects and particularly the vertical velocity of the airborne object, and a microcomputer section 16 which receives the first and second signals 13 and 15.

Microcomputer section 16 applies the velocity information conveyed in the second signal 15 to the height information conveyed in the first signal 13, to output a third compensated signal 18 representing the true height of the airborne object. The microcomputer section 16 is comprised of a single low cost integrated circuit chip, which may be purchased "off-the-shelf".

Figure 2:
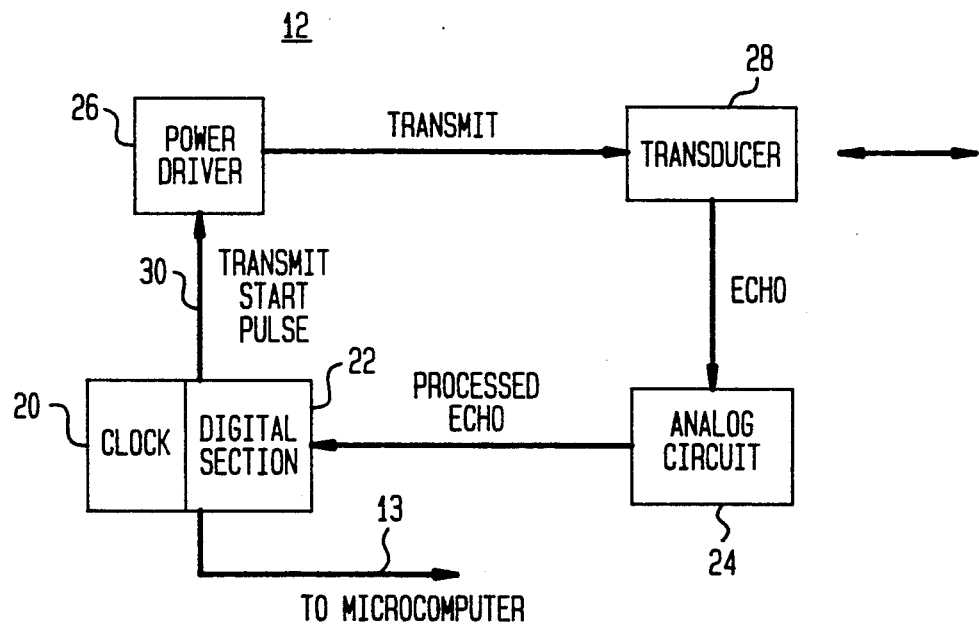
FIG. 2 depicts details of an ultrasonic rangefinder in the embodiment FIG. 1.

The internal structure of the ultrasonic rangefinding section 12 is shown in greater detail in FIG. 2. Referring to FIG. 2, rangefinding section 12 is seen to include six components: a clock 20, a digital section 22, an analog circuit 24, a power driver 26, an ultrasonic transducer 28 and a user interface (not shown).

Ultrasonic rangefinder section 12 is a known device, which may be of the pulse echo type. Such devices function by transmitting a pulse to a target and detecting the resulting echo. Inasmuch as the velocity of sound in the medium separating the two objects is fixed, the time between transmission of the pulse and detection of the returning echo is a linear function of the distance between the two objects. Thus, measurement of the elapsed time is equivalent to measurement of the distance between the objects and, using known techniques, is easily converted to represent that distance. For example, in air, the time required for a transmitted pulse to leave the transducer, strike an object and return to the transducer is, on average, 1.776 milliseconds per foot (1.776 ms/ft) in air at ground level.

In the embodiment of FIG. 2 clock 20 generate a sequence of pulses. The pulses may be generated every 100 ms, for example. The clock pulses are applied to the digital section 22 which provides a transmit start pulse 30 to the power driver 26. Driver 26, in turn, sends the pulse to ultrasonic transducer 28 for transmission to the target.

A binary counter, preset to count at a predetermined rate which may be established by clock 20, is triggered to begin counting in response to the transmit start pulse and to stop counting upon receipt of a pulse indicative of reception of the echo, provides a count proportional to the distance separating the objects. By providing a specific counting rate for the binary counter, the count may be caused to equal the distance between the objects in arbitrary distance units.

For example, the counter may be preset to count at a rate of 11.260 KHz, causing the count to increment every 0.0888 ms, corresponding to the time required for an ultrasonic pulse to travel 0.1 ft in sea level atmospheric air. Since the ultrasonic rangefinder detects pulses after travelling to and from an object, i.e., after making a double distance round trip, setting the counter to count at a rate of 5.630 KHz, i.e., incrementing every 0.1776 ms, results in a count which directly indicates the apparent distance between the objects in tenths of a foot.

In operation, upon reception of a returning echo by the transducer 28, the echo is provided to analog circuit 24 for pulse shaping and filtering, thus to provide a clearly defined sharp voltage pulse for application to the binary counter of digital section 22 in order to terminate the countup process initiated by the transmit start pulse. The count in the counter is proportional to the target distance.

This count is sampled by an on board microcomputer and is stored in a memory thereof. The count is also displayed in any of a number of known methods to provide a graphical indication of the apparent distance between the objects.

Although such a procedure provides a reasonably accurate indication of distance between two objects, when an unknown relative velocity exists between the objects, such as a vertical velocity between an airborne object descending to the surface of the earth, the apparent height therebetween is not accurate because of the relatively slow speed of sound in the medium (air) between the objects.

For example, for a descending airborne object 50 feet from the surface of the earth, 88.8 ms (50×1.776 ms) travel time is required for the pulse to travel from the transducer to the target and return to the transducer. Because of the velocity of the object, the actual height will have changed during the 88.8 ms time period, introducing a significant error to t e measure height distance. Due to such long transit times the repetition rate for the transmitted pulses is also low, approximately 100 ms, thus making impractical an attempt to extract velocity information from a dynamic ultrasonic ranging system using Doppler techniques.

In accordance with the invention, there is thus provided a Doppler radar transceiver to provide constant measurement of relative velocity between the objects (vertical velocity for a descending airborne object).

Figure 3:
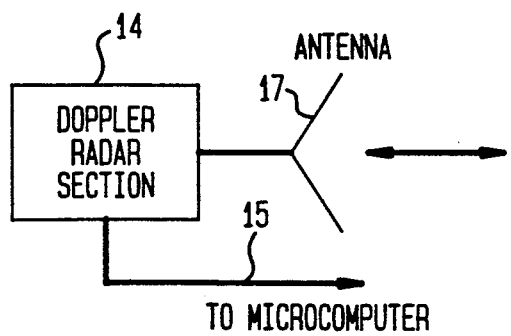
FIG. 3 prevents a Doppler radar transceiver incorporated in the embodiment of FIG. 1.

FIG. 3 shows the manner in which the Doppler radar transceiver is incorporated in the embodiment of FIG. 1. More particularly, as shown in FIG. 3, a Doppler radar transceiver 14 is connected to an antenna 17 in a known manner in order to transmit and receive RF signals. The transceiver 14 obtains an indication of relative velocity between two objects by determining a beat frequency between the transmitted and received signals, in a known manner. Information identifying the detected velocity is provided in the second signal 15 provided to the microcomputer of the microcomputer section 16.

As described in the following, the velocity information is combined with the apparent height information from the ultrasonic rangefinder to calculate true height above ground, which can be calculated at vertical velocities in the range of 0–100 ft/sec. Advantageously, the measured vertical velocity may also be used to control systems such as an Airdrop Deceleration System (ADS). Specifically, the true height maybe used to fire the ADS, while the payload velocity measured by the Doppler radar may be used to control a force exerted by the ADS to achieve an optimum landing impact. Moreover, the accurate height and vertical velocity information may also be provided to pilots for use especially during very low altitude flights.

Figure 4:
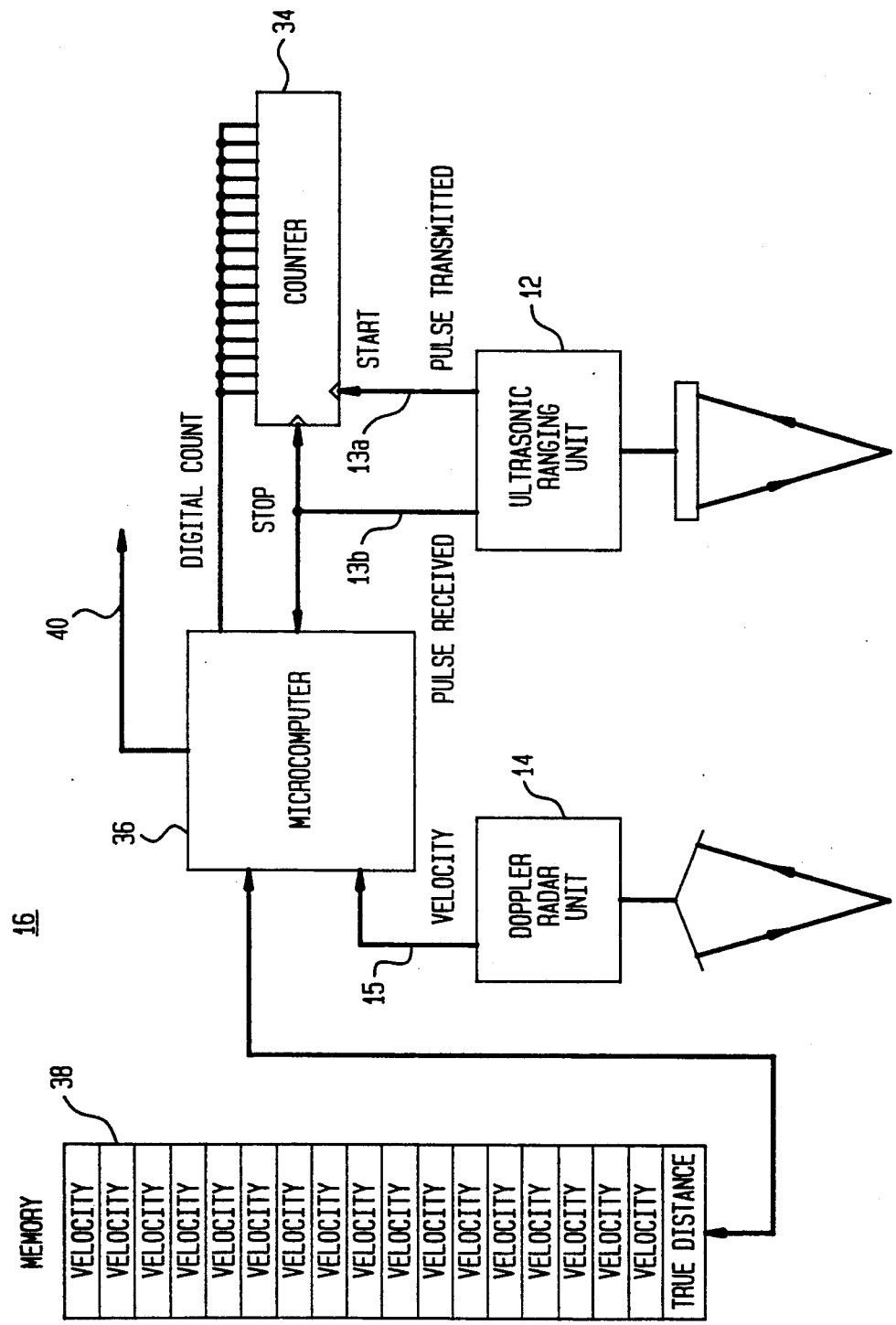
FIG. 4 illustrates an implementation of the inventive structure, including details of the compensating section of FIG. 1.

FIG. 4 shows an implementation of the inventive structure, including details of the compensating section 16. It should be noted that, as shown in the embodiment of FIG. 4, the apparent height information provided from the ultrasonic rangefinder is provided as two signals. A pulse transmission signal 13a, indicative of transmission of a pulse, is used to initiate counting by a counter 34. A pulse reception signal 13b, indicative of reception of a returned echo, is used to stop counting by counter 34. The signals are provided to a microcomputer 36, which actually computes the apparent height from the contents of counter 34 provided thereto.

As will be appreciated from the following description provided to illustrate operation of the embodiment of FIG. 4, counter 34 is incremented at a rate of 11.260 KHz, to provide a count increment each 0.0888 ms, rather than the previously noted illustrative value. By incrementing the count at twice the rate, the accuracy of the count is increased. Of course, any counting rate may be utilized, requiring only a multiplicative operation to convert the count to an apparent distance value.

In operation, the Doppler radar section 14 samples payload velocity every millisecond in a well known manner which need not be repeated herein. The velocity values are provided to microcomputer 36, which stores the same in a memory 38. As is known in the art, Doppler velocity measuring devices have an inherent range capability, dependent on the repetition frequency of the transmitted signals for example. When the payload approaches the impact point and the distance thereto enters the range of operation of Doppler radar section 14, the Doppler radar is triggered into operation.

One manner of triggering the radar into operation is the use of the apparent height value from ultrasonic rangefinder 12. Although not completely accurate, the apparent height is sufficiently accurate to be compared with a reference in order to generate a triggering signal for Doppler radar section 14. Another method may rely on detection of expected velocity values (within an expected range) from the Doppler unit, which are provided only once the Doppler unit is within its operating range.

In either case, at a height of approximately 30-100 feet above ground, the Doppler radar unit 14 begins acquisition of payload velocity data from its sensor and transmits the data to microcomputer 36 for storage in memory 38. Ultrasonic rangefinder 12 simultaneously acquires apparent height values. Whether the rangefinder or the microcomputer computes the apparent height does not affect operation of the invention. Either element may perform the simple computation. The apparent height values are also stored in memory 38.

The microcomputer calculates true height from apparent height as follows.

Upon storage of an apparent height value in memory, the velocity values stored during the elapsed time of the transmit/echo cycle of the ultrasonic rangefinder 12 are accessed by the microcomputer 36 for use in the following equations.

The microcomputer performs four operations using the count of binary counter 34, a constant A representing the counting period of counter 34 (e.g., 0.0888 ms), the payload velocity V determined by Doppler radar unit 14, and a second constant B representing the velocity of sound in the medium of travel (e.g., 1125 ft/sec in air at sea level).

Equation (1) establishes the total elapsed time TE from transmission to reception of the ultrasonic ranging pulse as $$TE = count \times A \qquad (1)$$

where A represents a clocking period for the counter chosen to equal the time required for the pulse to travel 0.1 foot, for example, in the medium of travel.

Equation (2) establishes the distance DE travelled by the payload during the time TE as $$DE = TE \times V \qquad (2),$$

where V is the payload velocity as determined either as a single recent determination of velocity by Doppler unit 14 or an average of velocity values sampled and recorded in memory 38 during an arbitrary period of elapsed time, such as the time TE (or a portion thereof).

Equation (3) computes the apparent distance DA to ground (or other target) by multiplying TE by the velocity of sound in the medium:

$$DA = TE \times 1125 \qquad (3).$$

Finally, equation (4) obtains the true distance DT to the target by subtracting the distance travelled DE from the apparent distance DA, and dividing by 2 to compensate for the fact that in computing DE and DA the value used for A represented 0.0888 ms, only the time required to travel to the object, rather than 0.1776 ms, the time required to travel 0.1 ft to the object and to return from the object. Thus, $$DT = (DA - DE)/2 \qquad (4).$$

As an illustration of the foregoing, where Doppler unit 14 determines a velocity of 100 ft/sec and the count of counter 34 is 1800, microcomputer 36 determines that:
(1) TE = 1800 × 0.0000888 = 0.15984 sec
(2) DE = 0.15984 × 100 = 15.984 ft
(3) DA = 0.15984 × 1125 = 179.82 ft and
(4) DT = (179.82 − 15.984)/2 = 81.918 ft.
Thus, although the apparent distance is 179.82/2 = 89.91 ft, the true distance is 81.918 ft.

As hereinabove noted, once the above apparent height value has been acquired, it is only necessary to decrement the distance travelled therefrom, as determined by equation (2), followed by determination of the true distance by equation (4).

Having transformed the apparent distance DA to the true distance DT, microcomputer 36 may output the same as a signal 40 for display, for activating various devices as hereinabove described, including but not limited to firing an ADS, operating a quick release lock, and the like.

Inasmuch as the operations performed by the microcomputer are straightforward, no further disclosure is necessary to enable one of ordinary skill to program a computer to execute the same.

It should be noted that, although the invention contemplates correction of height measurements for airborne objects at heights in the range of 10-200 feet and descending at velocities less than 100 feet per second, numerous other applications will be apparent to those of ordinary skill in the art. For example, accurate detection of the distance between two docking objects, or between two objects having relative movement with respect to one another, may be obtained. Neither the distance nor the velocity is required to be vertical to practice the invention, nor is it necessary for one of the objects to be fixed, such as a surface of an airport. Indeed, the landing target may itself be moving, such as an aircraft carrier, and it is the relative velocity between the two objects which is used to correct the apparent distance therebetween.

Further, the medium between the objects is not required to be air, or to be air at the density found on the earth's surface. For example, when two underwater vehicles are approaching one another, the ultrasonic rangefinder section, similarly to a sonar device, determines range by multiplying the time between transmission and reception by the velocity of sound in the medium. Where the medium is water, the velocity is different from that in air. Accordingly, in accordance with the invention the rangefinder may have a control for selecting the medium separating the two objects.

Similarly, when two airborne aircraft, for example, are docking at high altitude, the atmospheric density differs from that found at the surface of the earth. Accordingly, the velocity of sound differs from that at the earth's surface and the ultrasonic rangefinder may also be provided with a control for selecting altitude within the atmosphere, or depth underwater, in order more precisely to obtain the apparent distance separating the objects. Indeed, a look-up table may store a table listing velocities of sound in different media, as well as listing variation in velocity with depth (or height) within the medium. Thus, whether by inputting a programmed signal or by activating a switch, the look-up table may be accessed to provide the appropriate multiplicative factor for the detected time in order to provide the apparent distance separating the objects. A similar table may be used to establish the appropriate parameters for the Doppler radar section 14 for measurement of velocity.

As hereinabove described, by varying the counting rate for a binary counter the count thereof may be made to equal the apparent distance between the objects. Accordingly, the value from the look-up table may be used to control the counting frequency of the binary counter in order to simplify computation of the apparent distance.

The foregoing description of the preferred embodiment of the invention has been presented for purposes of illustration and description. It is not intended to be exhaustive or to limit the invention to the precise forms disclosed, since many modifications or variations thereof are possible in light of the above teaching. All such modifications and variations are within the scope of the invention. The embodiments described herein were chosen and described in order best to explain the principles of the invention and its practical application, thereby to enable others skilled in the art to utilize the invention in various embodiments and with various modifications as are suited to the particular use contemplated therefor. It is intended that the scope of the invention be defined by the claims appended hereto, when interpreted in accordance with the full breadth to which they are legally and equitably entitled.

We claim:

1. Hybrid distance measuring apparatus for correcting ultrasonic distance measurements comprising:
    ultrasonic means for measuring an apparent distance between first and second objects by transmission and reflection of ultrasonic signals;
    radar means for measuring a relative velocity between the first and second objects by transmission and reflection of radar signals; and
    compensating means for compensating the apparent distance measured by said ultrasonic means by modifying the apparent distance in accordance with the relative velocity measured by said radar means and for producing an indication of true distance between the objects.

2. Hybrid distance measuring apparatus as recited in claim 1, wherein said ultrasonic means produces a first signal indicative of the apparent distance being detected; said radar means produces a second signal indicative of a relative velocity being measured; and
    said compensating means comprises:
        computing means, responsive to said second signal, for computing a further relative distance travelled by the objects during measurement of said apparent distance by said ultrasonic means; and
        said computing means alters said first signal to produce a third signal indicative of the true distance between first and second objects.

3. Hybrid distance measuring apparatus as recited in claim 2, further comprising storage means, connected to the computing means, for storing said relative velocity measured by said radar means and for storing a true distance, and the computing means updating a previously obtained true distance by accessing said true distance in said storage means a predetermined time subsequent to a previous time of obtaining said true distance, accessing said relative velocity from said storage means, obtaining a product of said relative velocity and said predetermined time, and performing a signed addition of said product and said previously obtained true distance to obtain a sum representing a new value of the true distance between the two objects.

4. Hybrid distance measuring apparatus as recited in claim 1 wherein said ultrasonic means provides a first signal indicating transmission of an ultrasonic pulse thereby and a second signal indicating provision of an echo pulse thereto,
    said first signal connected to a counter for initiation a counting process at a predetermined clock frequency corresponding to a time required for the ultrasonic pulse to travel a predetermined distance through a medium between the two objects, said second signal connected to said counter for terminating said counting process,
    said counter outputting a count signal upon termination of said counting process, said count signal representing the apparent distance between the objects;
    said radar means outputting a third signal representing said relative velocity;
    said compensating means comprising computing means receiving said count signal and said third signal and programmed to compute said apparent distance represented by said count signal, to compute a compensating factor therefor, and to convert said count signal representing said apparent distance to an output signal representing said true distance.

5. Hybrid distance measuring apparatus as recited in claim 4, further comprising storage means for storing said relative velocity measured by said radar means and for storing a true distance computed by said computing means, said computing means further programmed for updating a previously obtained true distance upon passage of an updating time by accessing said stored true distance, accessing said relative velocity from said storage means, obtaining a product of said relative velocity and said updating time, and performing a signed addition of said product and said previously obtained true distance, thereby to obtain a sum representing a new value of the true distance between the two objects.

6. Hybrid height measuring system for correcting ultrasonic height measurements comprising:

ultrasonic means for measuring a height between a descending airborne object and a landing surface by transmission and reflection of ultrasonic signals;

radar means for measuring a vertical velocity of the descending object by transmission and reflection of radar signals; and compensating means for compensating an apparent height of the descending object measured by said ultrasonic means by modifying the apparent height in accordance with the vertical velocity measured by said radar means and for producing an indication of true height between the objects.

7. Hybrid height measuring apparatus as recited in claim 6, wherein said ultrasonic means produces a first signal indicative of the apparent height being detected; said radar means produces a second signal indicative of a vertical velocity being measured; and said compensating means comprises:

computing means, responsive to said second signal, for computing a change in the vertical height of the descending airborne object during measurement of said vertical height by said ultrasonic means; and said computing means applying a computed result to said first signal indicating said apparent height measured by said ultrasonic means and converting said first signal to a third signal indicating a true height of the descending airborne object.

8. Hybrid height measuring apparatus as recited in claim 7, further comprising storage means, connected to the computing means for storing said vertical velocity measured by said radar means and a previously obtained true height by accessing said true height a predetermined time subsequent to a previous time of obtaining a produce of said vertical velocity and said predetermined time, and performing a signed addition of said product and said previously obtained true height to obtain a sum representing a new value of the true height between the two objects.

9. Hybrid height measuring apparatus as recited in claim 6 wherein said ultrasonic means provides a first signal indicating transmission of an ultrasonic pulse thereby and a second signal indicating provision of an echo pulse thereto, said first signal connected to a counter for initiation a counting process at a predetermined clock frequency corresponding to a time required for the ultrasonic pulse to travel a predetermined distance through a medium between the descending airborne object and the landing surface, said second signal connected to said counter for terminating said counting process, said counter outputting a count signal upon termination of said counting process, said count signal representing the apparent height of the airborne object above the landing surface;

said radar means outputting a third signal representing said vertical velocity;

said compensating means comprising computing means receiving said count signal and said third signal and programmed to compute said apparent height represented by said count signal, to compute a compensating factor therefor, and to convert said count signal representing said apparent height to an output signal representing said true height.

10. Hybrid height measuring apparatus as recited in claim 9, further comprising storage means for storing said vertical velocity measured by said radar means and for storing a true height computed by said computing means, said computing means further programmed for updating a previously obtained true height upon passage of an updating time by accessing said stored true height, accessing said vertical velocity from said storage means, obtaining a product of said vertical velocity and said updating time, and performing a signed addition of said product and said previously obtained true height, thereby to obtain a sum representing a new value of the true height between the two objects.

* * * * *